United States Patent [19]
Grant et al.

[11] Patent Number: 5,502,719
[45] Date of Patent: Mar. 26, 1996

[54] PATH ALLOCATION SYSTEM AND METHOD HAVING DOUBLE LINK LIST QUEUES IMPLEMENTED WITH A DIGITAL SIGNAL PROCESSOR (DSP) FOR A HIGH PERFORMANCE FIBER OPTIC SWITCH

[75] Inventors: Robert H. Grant; Bent Stoevhase; Robin Purohit, all of Toronto; David Book, Thornhill, all of Canada

[73] Assignee: Hewlett-Packard Company, Palo Alto, Calif.

[21] Appl. No.: 330,044

[22] Filed: Oct. 27, 1994

[51] Int. Cl.[6] .................................................. H04J 13/00
[52] U.S. Cl. .......................... 370/58.2; 370/61; 359/117; 395/250
[58] Field of Search ................... 370/58.1, 58.2, 370/58.3, 60, 60.1, 61, 85.6, 94.1, 94.2; 359/117; 395/250

[56] References Cited

U.S. PATENT DOCUMENTS

| | | | |
|---|---|---|---|
| 5,136,582 | 8/1992 | Firoozmand | 370/85.1 |
| 5,247,626 | 9/1993 | Firoozmand | 370/85.1 X |
| 5,313,582 | 5/1994 | Hendel et al. | 395/250 |

Primary Examiner—Melvin Marcelo
Attorney, Agent, or Firm—Richard F. Schuette

[57] ABSTRACT

A fiber optic switch interconnects ports (p1–pi) for connection with respective fiber optic channels so that a fiber optic network is realized. Channel modules provide the ports. Each channel module has a port intelligence mechanism for each port and a memory interface system for temporarily storing data passing to and from the ports. A switch module having a main distribution network, an intermix distribution network, and a control distribution network interconnects the memory interface systems and permits exchange of data among the ports and memory interface systems. A path allocation system controls the switch module and allocates the data paths therethrough. The path allocation system has a scheduler which maintains a destination queue ($Q_{p1}$–$Q_{pi}$) for each of the ports. The destination queues are implemented with a double link list in a single memory configuration so that a separate queue structure in hardware is not necessary. Moreover, the scheduler is implemented with a digital signal processor (DSP) with on-chip memory so that the queues are implemented within the on-chip memory and can be accessed at high speed.

20 Claims, 9 Drawing Sheets

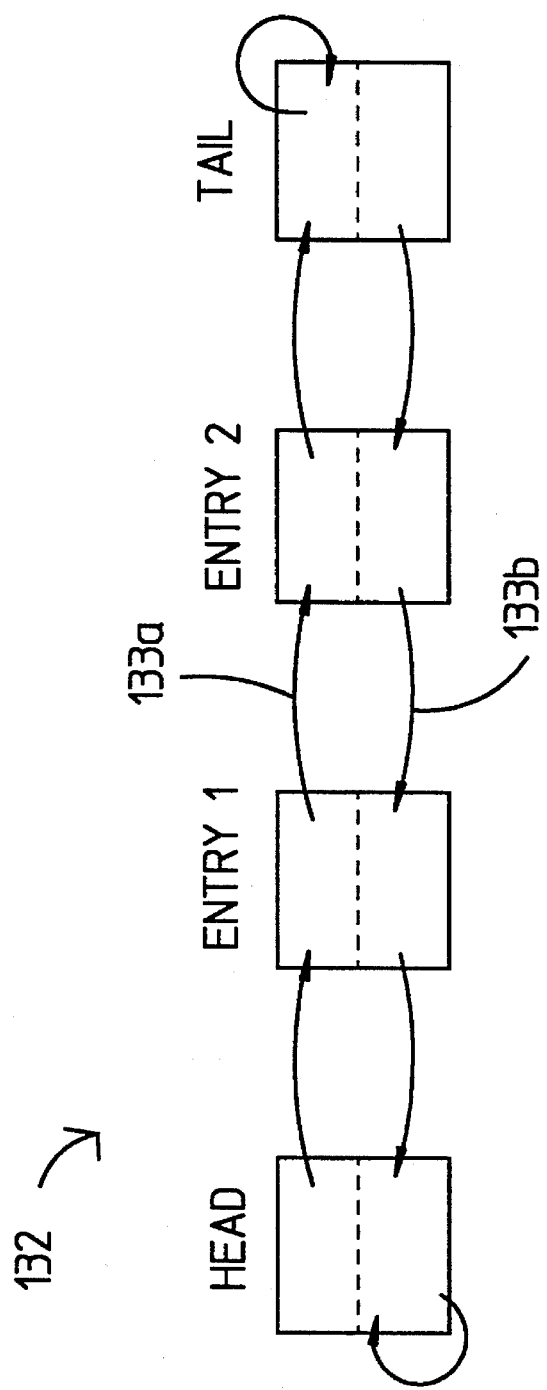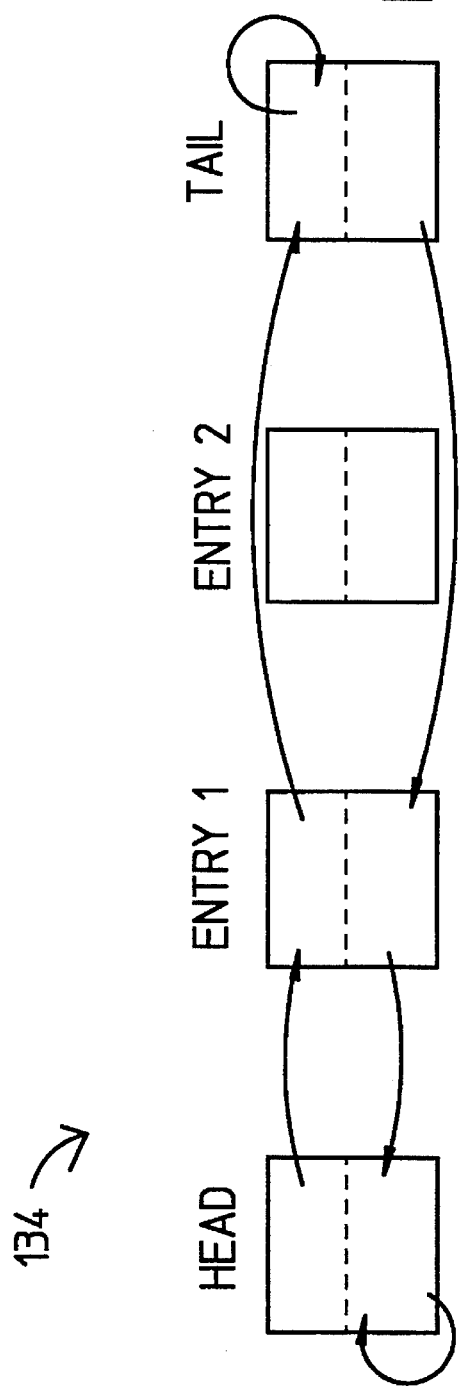

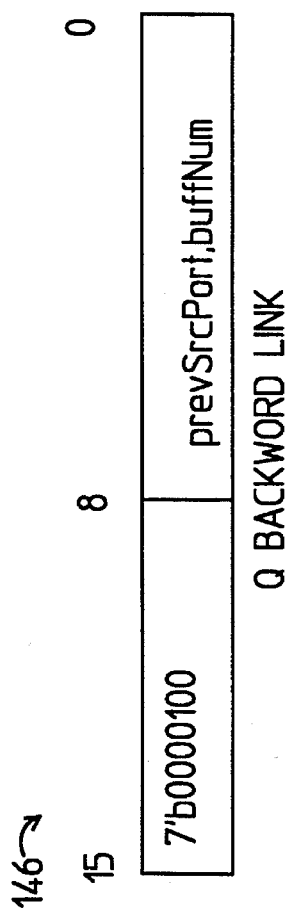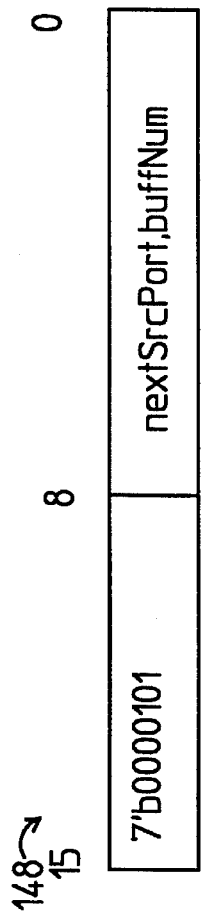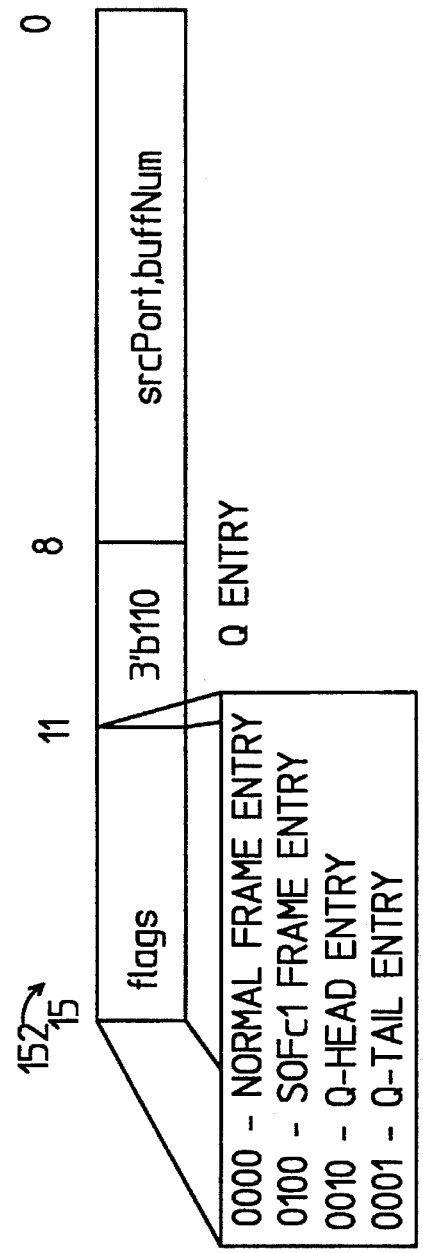

PATH ALLOCATION SYSTEM AND METHOD HAVING DOUBLE LINK LIST QUEUES IMPLEMENTED WITH A DIGITAL SIGNAL PROCESSOR (DSP) FOR A HIGH PERFORMANCE FIBER OPTIC SWITCH

FIELD OF THE INVENTION

The present invention generally relates to data communications and fiber optic networks, and more particularly, to a path allocation system and method for implementing a high performance fiber optic switch for a fiber optic network, while providing flexibility and optimally minimizing hardware requirements.

BACKGROUND OF THE INVENTION

A data communications network generally includes a group of interconnected communication channels which provides intercommunication among a combination of elements or devices, for instance, computers, peripherals, etc. Historically, networks have been constructed by utilizing communication channels formed from coaxial cables and/or twisted pair cable configurations and interconnected via a suitable interface, or switching module.

Fiber optic cables are increasingly being used in the network industry, instead of coaxial cables and twisted pairs, because of their much broader bandwidth, better propagation properties, and other optimal transmission characteristics. Recently, the Fibre Channel protocol was developed and adopted as the American National Standard For Information Systems (ANSI). The Fibre Channel industry standard is described in detail in, for example, *Fibre Channel Physical And Signalling Interface*, Rev. 4.2, American National Standard For Information Systems (ANSI) (1993). The Fibre Channel industry standard provides for much higher performance and greater flexibility than previous industry standards by allowing for variable-length data frames, or packets, to be communicated through fiber optic networks which comply with the standard.

A variable-length frame 11 is illustrated in FIG. 1. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection and/or correction, and by a 4 byte end-of-frame (EOF) indicator 18. The frame 11 of FIG. 1 is much more flexible than a fixed frame and provides for higher performance by accommodating the specific needs of specific applications.

The Fibre Channel industry standard also provides for several different types of data transfers. A class 1 transfer requires circuit switching, i.e., a reserved data path through the network switch, and generally involves the transfer of more than one data frame, oftentimes numerous data frames, between the network elements. In contrast, a class 2 transfer requires allocation of a path through the network switch for each transfer of a single frame from one network element to another.

To date, fiber optic switches for implementing networks in accordance with the Fibre Channel industry standard are in a state of infancy. One such fiber optic switch known in the industry is ANCOR, which is manufactured by and made commercially available from IBM, U.S.A. However, the performance of the ANCOR switch is less than optimal for many applications and can be improved significantly. Moreover, the ANCOR switch is inflexible in that it provides for primarily circuit switching (reserved path) for class 1 transfers and is very limited with respect to frame switching for class 2 transfers.

Thus, a heretofore unaddressed need exists in the industry for new and improved systems for implementing the Fibre Channel industry standard in fiber optic networks with much higher performance than presently existing systems. Specifically, there is a significant need for a fiber optic switch system and method which can provide for both reserved path (circuit switching) transfers and frame transfers with high performance, while minimizing hardware requirements and exhibiting high flexibility for a variety of applications.

SUMMARY OF THE INVENTION

An object of the present invention is to overcome the deficiencies and inadequacies of the prior art as noted above and as generally known in the industry.

Another object of the present invention is to provide a high performance fiber optic switch system and method for implementing a high performance fiber optic network.

Another object of the present invention is to provide a high performance path allocation system and method for implementing a high performance fiber optic switch for a fiber optic network.

Another object of the present invention is to provide a path allocation system and method for implementing a fiber optic switch for a fiber optic network with minimum hardware requirements.

Another object of the present invention is to provide a path allocation system and method which provide for both efficient reserved path (i.e., circuit switching) and frame switching so as to accommodate, for example, class 1 and class 2 transfers, respectively, in accordance with the Fibre Channel industry standard.

Another object of the present invention is to provide a path allocation system and method which is simple in design, inexpensive to implement on a mass commercial scale, and reliable as well as efficient in operation.

Briefly described, the present invention provides for a path allocation system and method for implementing a fiber optic switch for selectively interconnecting fiber optic channels in a fiber optic network. The system is constructed as follows. A plurality of ports are associated respectively with a plurality of fiber optic channels of the network. Each of the ports has a corresponding port intelligence mechanism, which comprises a transmitter and a receiver.

A memory interface system has receive memory and is associated with a plurality of the port intelligence mechanisms (or ports) for temporarily storing incoming new data frames from source ports for class 2 data transfers (frame switching). The memory interface system has bypass paths for class 1 data transfers (circuit switching).

A switch module interconnects the memory interface systems for exchange of data among ports and receive memory. The switch module includes, among other things, a main distribution network (MDN), an intermix distribution network (IDN), and a control distribution network (CDN).

The switch module and the data exchanges therethrough are controlled by a path allocation system. The path allocation system comprises a new event generator, a scheduler, and an arbitrator. The new event generator communicates with the port intelligence mechanisms and with the receive memories through the switch module. It determines when a new data frame has been received by the receive memories, and it solicits path data from the port intelligence mechanisms regarding new data frames.

The scheduler receives path data from the new event generator after the new event generator recognizes a new data frame. The path data includes, e.g., a source port indicator, a memory address, and a destination port indicator. In the preferred embodiment, the scheduler is implemented with a digital signal processor (DSP) on a discrete integrated circuit component having an on-board memory.

The scheduler maintains a destination queue corresponding with each of the ports. Each queue is configured to store queue entries specifying data destined for its corresponding port. Each queue entry comprises a source port indicator which identifies a source channel module and a buffer indicator which identifies a particular buffer within the receive memory of the source channel module, where the data frame can be found.

Significantly, each of the destination queues is defined in common memory space by a link list, preferably a double link list, which implements a first-in-first-out procedure. Specifically, in the single link list configurations there is a link, or pointer, associated with each entry which identifies the next successive entry of the list. In the double link list configuration, there is a forward link and a backward link associated with each of the queue entries. The backward link designates a previous queue entry, and the forward link designates a subsequent queue entry.

The arbitrator ultimately controls data transfers through the switch module and communicates with the scheduler and the port intelligence mechanisms. The arbitrator determines when the ports are available or are busy servicing other data transfer requests. If available, the arbitrator allows communication (class 1 transfer or class 2 transfer) of the data between ports via the MDN or IDN of the switch module.

In addition to achieving all the objects as denoted previously, the present invention also has many other advantages, a few of which are indicated hereafter.

An advantage of the present invention is that the link list configuration eliminates the need for separate hardware queues for each destination port.

An advantage of the present invention is that the link list configuration provides for flexibility by permitting queues of any length, i.e., any number of queue entries, for each destination port.

Another advantage of the present invention is that the link list configuration for construction of destination queues permits easy and quick deletion of queue entries.

Another advantage of the present invention is that the link list configuration can be implemented within the on-chip memory of a digital signal processor (DSP). The DSP advantageously permits pipelining of multiple instructions and very fast access to its memory. Hence, no external memory is required, as would be in the case of most currently available RISC-based processors. Moreover, a DSP is much less expensive than other available full functionality processors with an on-chip memory.

Another advantage of the present invention is that the link list configuration implemented in a processor is much more flexible than such an implementation in an application specific integrated circuit (ASIC).

Another advantage of the present invention is that the link list configuration implemented in a processor provides much higher performance than a strictly software design.

Other objects, features, and advantages of the present invention will become apparent to one of skill in the art upon examination of the following drawings and detailed description. All such additional objects, features, and advantages are intended to be incorporated herein.

BRIEF DESCRIPTION OF THE DRAWINGS

The present invention can be better understood with reference to the following drawings. The drawings are not necessarily to scaled emphasis instead being placed upon clearly illustrating principles of the present invention.

FIG. 5A is a schematic diagram showing a double link list with forward links and backward links which is used for defining each of the destinations queues in the scheduler of FIG. 4;

FIG. 5B is a schematic diagram showing the double link list of FIG. 7A with a queue entry deleted;

FIGS. 7A through 7C are schematic diagrams showing the queue entry structures for the destination queues within the scheduler of FIG. 4.

DETAILED DESCRIPTION OF THE PREFERRED EMBODIMENT

Figure 2:
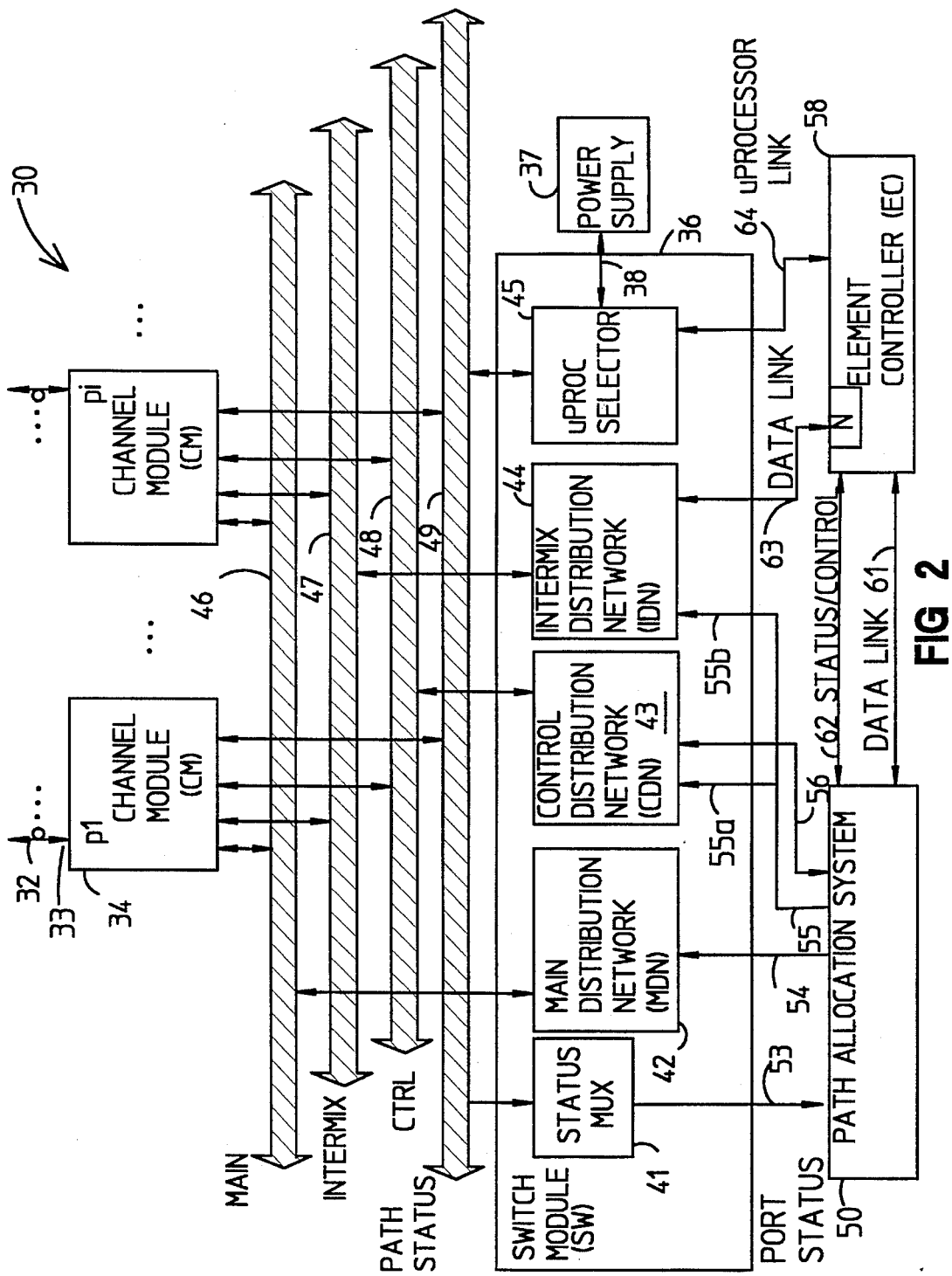
FIG. 2 is a schematic circuit diagram of a high performance fiber optic switch of the present invention.

With reference now to the drawings wherein like reference numerals designate corresponding parts throughout the several views, a schematic circuit diagram of a fiber optic switch 30 is shown in FIG. 2. The fiber optic switch 30 enables implementation of a fiber optic network by permitting selective interconnection of a plurality of fiber optic channels 32. The fiber optic switch 30 is a very flexible systems permits both circuit and frame switching for class 1 and 2 data transfers, respectively, in accordance with the Fibre Channel industry standard, and is a much higher performance system than other conventional fiber optic switches.

In architecture, the fiber optic switch 30 has a plurality of channel modules 34 to which the fiber optic channels 32 are connected via respective ports (p1–pi) 33, Each channel module 34 is allocated and connected to one or more of the fiber optic channels 32. Each channel module 34 provides port intelligence for data communication with the channels, as well as bypass connections for class 1 data transfers and receive memory for temporarily storing data frames for class 2 data transfers, as will be further described in detail later in this document. The channel modules 34 are connected to a switch module 36, which receives and distributes electrical energy from a power supply 37. In the preferred embodiment, the switch module 36 is implemented as part of a backplane and has disposed thereon a number of functional interface elements.

The switch module 36 has a status multiplexer (MUX) 41 which is configured to receive status signals from the channel modules 34 concerning the ports 33 and associated circuitry. The status signals include at least the following: a "new frame arrived" signal, which indicates when a new frame has been received by a receive memory 84 (FIG. 3) associated with the channel module 34; a receiver ready, or "rxready" signal, which indicates when data received from a port 33 is ready and not ready to be sent through the switch 30 from the receive memory 84 (FIG. 3); an "intermix bus ready" signal, which indicates when the IDN 44 is ready (not being used) and not ready (currently being used) to transfer data; a "port active" signal, which indicates when a port intelligence mechanism 73 (FIG. 3) associated with a port 33 is active/inactive; a "transmitter ready" signal, which indicates when a transmit memory 86 (FIG. 3) associated with a port 33 is ready and not ready to receive data (destined for a destination port 33) from the switch 30, an "intermix ready" signal, which indicates when the IDN 44 is ready and not ready to perform an intermix transfer, and a "transfer status ready," or "xfer ready," signal, which indicates when status information is ready and not ready to be transferred to the path allocation system 50 from the associated status/control logic 85 (FIG. 3) of a channel module 34.

Referring again to FIG. 2, main distribution network (MDN) 42 selectively interconnects the main data paths of the channels 32. A control distribution network (CDN) 43 controls the MDN 42 and communicates control signals to the various channel modules 34. An intermix distribution network (IDN) 44 selectively interconnects intermix data paths between channel modules 34. Intermix data paths are a set of alternate data paths which are separate from those main data paths associated with the MDN 42 and which can permit data flow between selected ports 33 while main data paths of the MDN 42 are in use. Finally, a processor selector 45 can optionally be provided as part of an auxiliary system for interconnecting and providing communication among processors and controllers distributed throughout the fiber optic switch 30.

A path allocation system 50 is connected to the switch module 36 and, particularly, to the status multiplexer 41, the MDN 42, the CDN 43, and the IDN 44. The path allocation system 50 generally allocates data interconnect paths through the switch module 36 and between fiber optic ports 33 and determines the priority of the connections. The path allocation system 50 is a significant element of the present invention and because of its design, results in very desirable performance attributes with minimum hardware requirements, as will be further described in detail hereinafter.

Also optionally connected to the switch module 36 is an element controller (EC) 58. The element controller 58 essentially provides servers, for example, a name server, a time server, etc. for the interface system 30. The element controller 58 has a data connection 61 with the path allocation system 50 for communicating server information and a status/control connection 62 for exchanging status/control signals with the path allocation system 50. The element controller 58 also exchanges initialization and/or configuration information with the channel modules 34 and the microprocessor selector 45 via connection 64.

Figure 3:
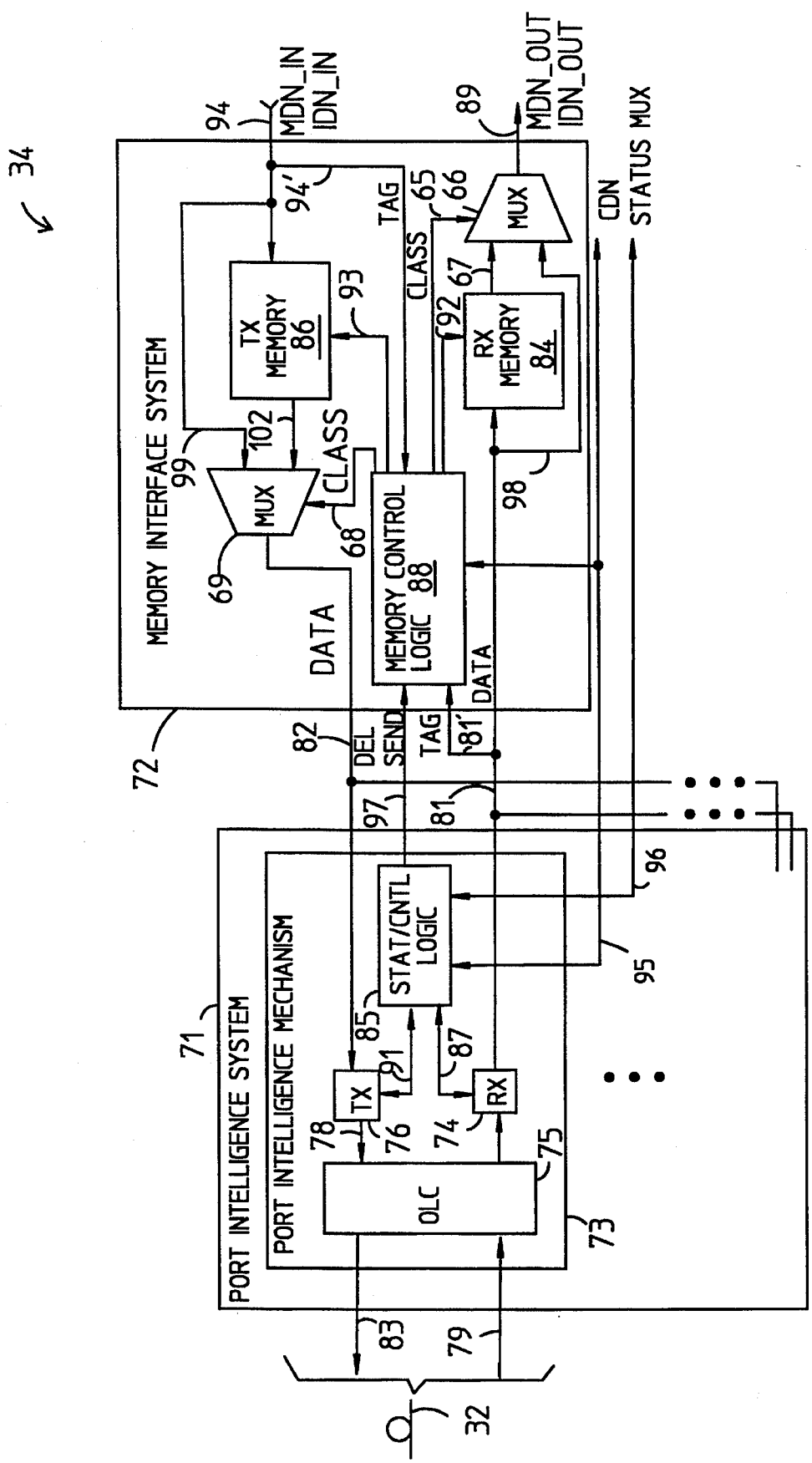
FIG. 3 is a schematic circuit diagram of a channel module (CM) of FIG. 2 which comprises a memory interface system connected to at least one port intelligence mechanism.

Preferably, each of the channel modules 34 is constructed as indicated in the schematic circuit diagram of FIG. 3. With reference to FIG. 3, each channel module 34 comprises a port intelligence system 71 connected to a memory interface system 72. In the preferred embodiment, the port intelligence system 71 has one or more port intelligence mechanisms 73. One port intelligence mechanism 73 is allocated to each fiber optic channel 32. Each port intelligence mechanism 73 has a receiver (RX) 74, a transmitter (TX) 76, an optical link card (OLC) 75, and a status/control (STAT/CNTL) logic 85. The receiver 74 and the transmitter 76 are adapted to receive and transmit data, respectively, through their corresponding input and output fibers 79, 83 (shown collectively in FIG. 2 as channel 32) in accordance with the Fibre Channel industry standard protocol and at the channel's particular bit rate.

The OLC 75 is utilized to directly interface the port intelligence mechanism 73 to the fiber optic channel 32. The OLC 75 provides an optical-to-electrical conversion as well as a serial-to-parallel conversion between the input fiber 79 of the channel 32 and the receiver. Furthermore, the OLC 75 provides an electrical-to-optical conversion as well as a parallel-to-serial conversion between the output fiber 83 of the channel 32 and the transmitter 76. The OLC 75 can be any suitable conventional optical link card, for example but not limited to, a model OLC266 manufactured by and commercially available from IBM Corp., U.S.A., or a model MIM266 manufactured by and commercially available from ELDEC, Inc., U.S.A.

The status/control logic 85 monitors and controls both the receiver 74 and the transmitter 76, as indicated by corresponding bidirectional control connections 87, 91. Further, the status/control logic 85 exchanges control signals on control connection 95 with the CDN 43 (FIG. 2), provides status signals on connection 96 to the status MUX 41 (FIG. 2) indicative of, e.g., whether the corresponding port 33 is available or busy, and forwards control signals to the memory interface system 72 via connection 97. The status/control logic 85 further recognizes when a new frame is received by the receiver 74 and determines the transfer class (either 1 or 2) as well as the length of data pertaining to each new frame. It should be noted that a frame could have no data, as for example, in the case of an SOFc1 frame, which is initially passed through the switch 30 for setting the switch 30 up to reserve a bidirectional path for a class 1 data transfer.

The memory interface system 72 is connected in series, or cascaded, with the port intelligence system 71, and particularly, with each port intelligence mechanism 73 contained therein. The memory interface system 72 generally provides class 1 bypass data connections 98, 99 for class 1 data transfers and provides temporary storage for class 2 data transfers. For data storage relative to class 2 data transfers, the memory interface system 72 has a receive memory (RX MEMORY) 84 for source data, a transmit memory (TX MEMORY) 86 for destination data, and memory control logic 88 for controlling the receive and transmit memories 84, 86. The receive memory 84 and the transmit memory 86 may be partitioned into a number of individual buffers or memory blocks, if desired.

Figure 1:
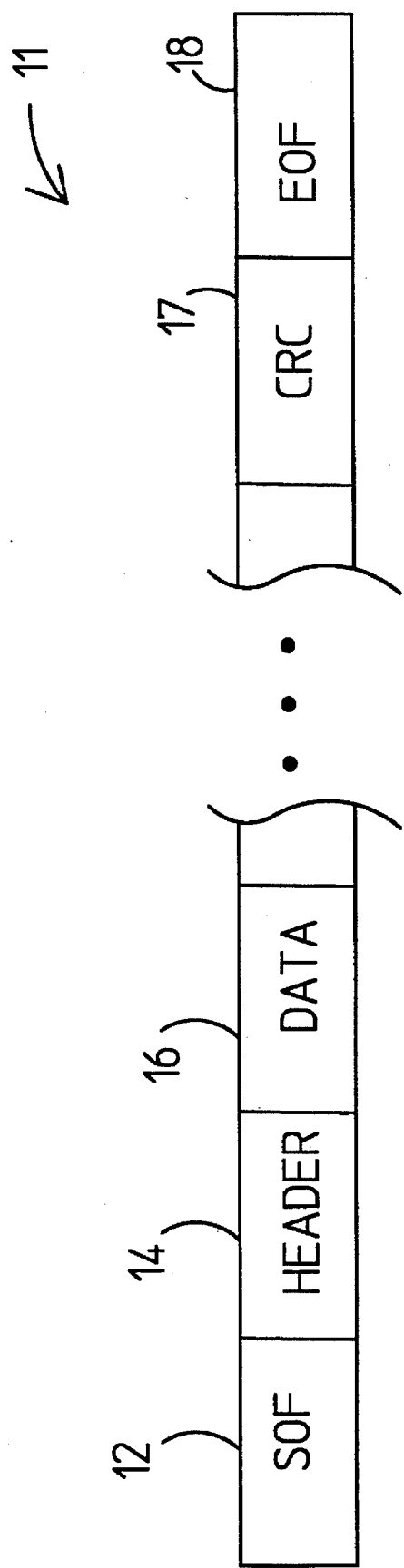
FIG. 1 is a schematic diagram of a variable-length frame communicated through a fiber optic network in accordance with the Fibre Channel industry standard.

When incoming class 1 source data is received by the memory interface system 72 from the port intelligence system 71, the source data bypasses the receive memory 84 via successively bypass data connection 98, MUX 66, and data connection 89. The data connection 89 introduces the source data to the data buses of the MDN 42 or the IDN 44 of the switch module 36. The memory control logic 88 receives a tag 81" from the receiver 74 indicative of either a class 1 or class 2 data transfer and controls the MUX 66 accordingly on class control connection 65. The receiver 74 generates the tag 81' based upon the header 14 (FIG. 1) on the incoming data. In the preferred embodiment, two-bit tags are used. A tag "00" indicates nonuse. A tag "01" indicates data. A tag "10" indicates either SOF or EOF for a class 1 data transfer. A tag "11" indicates either SOF or EOF for a class 2 data transfer.

When incoming class 2 source data is received by the memory interface system 72 (as well as an SOFc1 frame), as is determined by the memory control logic 88 via tag 81', the receive memory 84 reads and stores the source data from the receiver 74 via data connection 81 under the control of the memory control logic 88. Moreover, when the timing is appropriate, the receive memory 84 writes data to the data buses of the MDN 42 or the IDN 44 of the switch module 36 via data connection 67, MUX 66, and data connection 89 under the control of the control logic 88. In order to transfer data from the receive memory 84 to the data buses, the CDN 43 (FIG. 2) communicates a send control signal 95 to the status/control logic 85, and the status/control logic 85 in turn forwards a send signal via control connection 97 to the memory control logic 88. The send signal from the status/control logic 85 designates the length of the data frame to be sent. Based upon the send signal, the memory control logic 88 controls the receive memory 84 via control connection 92 and controls the MUX 66 with class control connection 65 so that the MUX 66 communicates data from the receive memory 84 to the data connection 89. If desired, the CDN 43 can also delete frames within the receive memory 84 by sending a delete signal (del) to the status/control logic 85, which in turn forwards the delete command to the memory control logic 88 via control connection 97.

Destination data intended for a destination port 33 from the data buses of the MDN 42 or the IDN 44 is made available to the transmit memory 86, as indicated by data connection 94, and the MUX 69, as indicated by the bypass data connection 99. A two-bit tag on tag connection 94', similar to the two-bit tag on tag connection 81', informs the memory control logic 88 when the destination data corresponds to either a class 1 data transfer or a class 2 data transfer. When class 1 destination data is received, the memory control logic 88 controls the MUX 69 via control connection 68 so that the MUX 69 channels the destination data directly to the transmitter 76 of the appropriate port intelligence mechanism 73 via data connection 82, thereby effectively bypassing the transmit memory 86. In contrast, when class 2 destination data is received by the memory interface system 72, the memory control logic 88 controls the transmit memory 86 to store the incoming destination data via data connection 94. When timing is appropriate, the destination data is then ultimately forwarded to the transmitter 76 of the appropriate port intelligence mechanism 73 via successively data connection 102, MUX 69, and data connection 82, under the control of the memory control logic 88.

Figure 4:
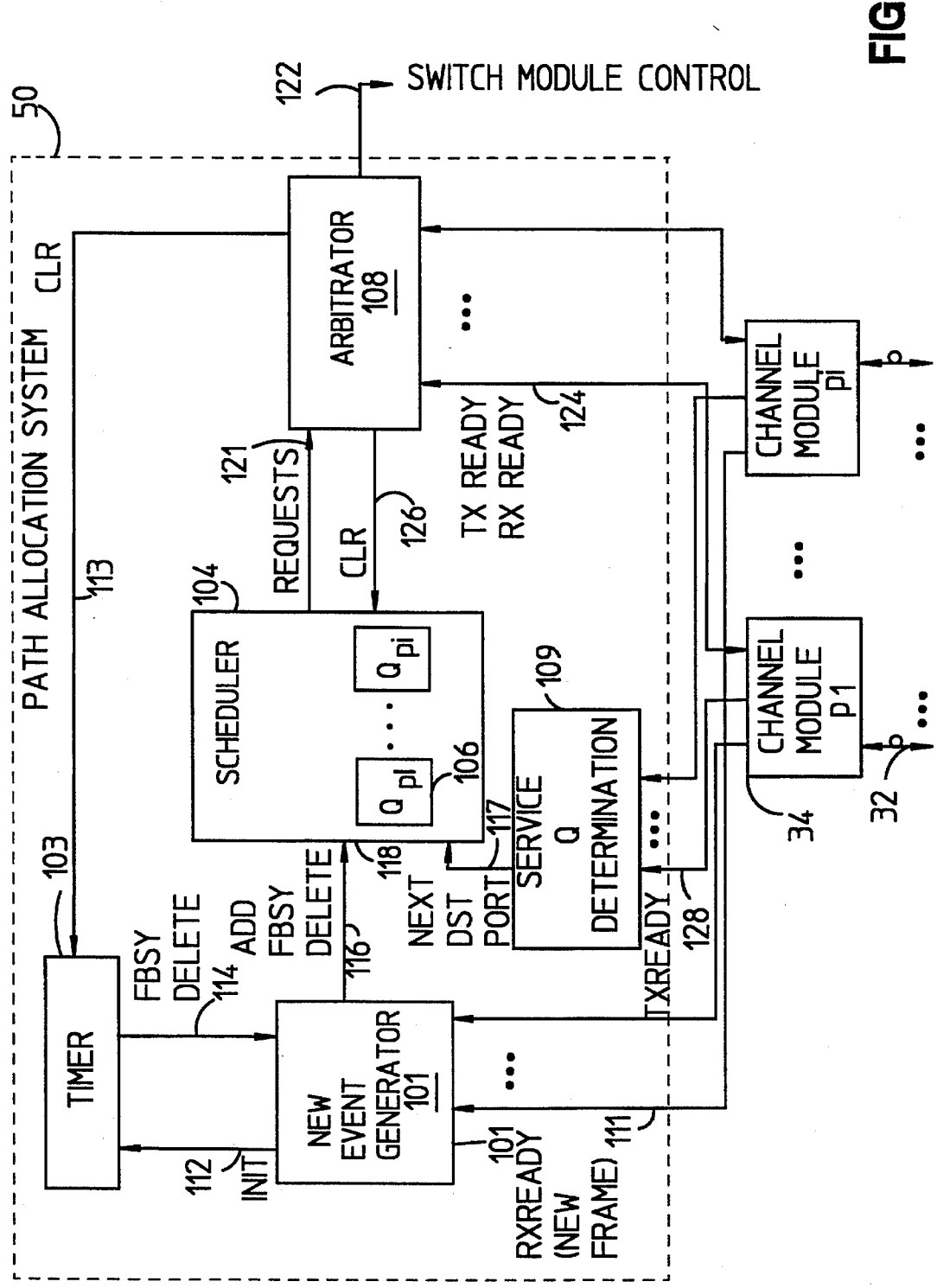
FIG. 4 is a schematic circuit diagram of the path allocation system of FIG. 2.

The novel path allocation system 50 is illustrated in FIG. 4. As mentioned, the path allocation system 50 allocates the data paths through the switch module 36. In architecture, the preferred embodiment of the path allocation system 50 has a new event generator 101 in communication with the channel modules 34, a timer 103 connected to the new event generator 101 for providing timing information thereto, a scheduler 104 connected to the new event generator 101 and adapted to maintain a destination queue ($Q_{p1}$–$Q_{pi}$) 106 corresponding with each of the ports (p1–pi) 33 (or channels 32), an arbitrator 108 connected to the scheduler 104 and in communication with the channel modules 34 via the switch module 36, and a service queue determination mechanism 109 in communication with the channel modules 34 via the path status/control bus 48 and connected to the scheduler 104.

The new event generator 101 can be implemented with any suitable logic, for example, with a state machine(s) in a conventional field programmable gate array (FPGA) having the functionality as set forth hereafter. The new event generator 101 determines when a new frame is available for routing through the MDN 42 or IDN 44 of the switch module 36. The new event generator 101 essentially looks for an rxready signal 111 from the status MUX 41 (ultimately from the status/control logic 85 of FIG. 3), which indicates that a new frame is available for routing through the switch 30 from one of the memory interface systems 72. Upon receiving an rxready signal 111, the new event generator 101 retrieves path data from the CDN 43 (ultimately from one of the status/control logic 85 of FIG. 3). The path data includes a destination port identification (DID) from the header (FIG. 1) of the data frame, which is mapped by the new event generator 101 to an appropriate destination port 33 via a routing table(s). The new event generator 101 further determines the appropriateness of a new frame for a destination port 33 (i.e., whether the frame can be intermixed onto a class 1 stream), and determines whether a new frame is proper or in error.

Moreover, the new event generator 101 provides queue command information, as indicated by control connection 116, to the scheduler 104. The queue command information includes an add signal, a frame busy (fbsy) signal, and a delete (del) signal. The add signal is sent when a new frame is within the receive memory 84 of a memory interface system 72 and is ready to be routed through the fiber optic switch 30. The fbsy signal is sent when the new frame has resided in the receive memory 84 for a predetermined time period (i.e., fbsy time period) which is considered too lengthy for the system. The delete signal is sent when the frame has resided in the receive memory 84 for another predetermined time period (i.e., delete time period), which is longer than the fbsy time period, and which warrants deletion of the frame. A delete signal may also be issued for other error conditions.

The timer 103 can be implemented with any conventional processing mechanism, for instance, a conventional digital signal processor (DSP). The timer 103 measures the time in which a new frame resides within the receive memory 84 of a channel module 34 and determines when a fbsy signal and when a delete signal should be asserted by the new event generator 101 to the scheduler 104. The timer 103 maintains internally a clock for tracking the fbsy and delete time periods for each new frame, receives an initiate signal 112 from the new event generator 101 for starting the clock, receives a clear (CLR) signal 113 from the arbitrator 108 for clearing the clock, and outputs a busy signal (fbsy) and a delete signal to the new event generator 101, as denoted by control connection 114. The new event generator 101 causes the timer 103 to commence keeping time with the clock via an initiate signal 112 when a new frame is ready to be added to a destination queue ($Q_{p1}$–$Q_{pi}$) 106. If the timer 103 does not receive a timer clear signal 113 from the arbitrator 108 within the predetermined fbsy time period, then the timer 103 will forward a fbsy signal 114 to the new event generator 101. If the timer 103 still does not receive the timer clear signal 113 and the predetermined delete time period elapses, then the timer 103 will forward a delete signal 114 to the new event generator 101. The timer clear signal 113 disables the fbsy/del clock of the timer 103 for the frame.

The scheduler 104 maintains and manages the destination queues ($Q_{p1}$–$Q_{pi}$) 106 and receives the queue management commands, particularly, an add signal, a fbsy signal, and a delete signal, from the new event generator 101. The scheduler 104 also receives a next destination port signal 117 from the service queue determination mechanism 109. The signal 117 indicates the next fiber optic channel 32 to service (and hence, the next destination queue 106 to service).

In general, the scheduler 104 provides a destination queue ($Q_{p1}$–$Q_{pi}$) 106 for each port (p1–pi) 33 and each queue is configured to store queue entries associated with each corresponding port 33. Each queue entry has new frame information which identifies a source port 33 from which the data originated and a specific buffer number (buffers 154 of FIG. 8) for identifying the data within the port's associated receive memory 84. Moreover, each queue 106 is defined in memory by a link list wherein queue entries are arranged in an order by the link list and each queue entry has an associated link, or pointer, for a successive (next) queue entry. Preferably, the link list implements a first-in-first-out buffer procedure for storing and retrieving queue entries from each queue 106.

When the scheduler 104 receives new frame information from a fiber optic channel 32 via an add signal 116 from the new event generator 101, the scheduler 104 stores the new frame information in the appropriate destination queue 106 along with a forward and a backward link. Moreover, when the scheduler 104 writes out from a destination queue 106, the scheduler 104 retrieves the queue entries from each of the destination queues in an order defined by the link list associated therewith and then causes transfer of the new frames between the source fiber optic channels and the destination fiber optic channels by sending a request 121 to the arbitrator 108, which in turn causes the switch module 36 to interconnect the appropriate data paths via the MDN 42 or IDN 44.

When the scheduler 104 receives a fbsy signal 116 corresponding to a frame from the new event generator 101, the scheduler 104 takes the queue entry associated with the fbsy signal 116 and moves the queue entry to the destination queue corresponding to the port where the data originated, so that the data is eventually returned to the port from which it came.

When the scheduler 104 receives a delete signal 116 corresponding to a frame, the scheduler 104 will delete the queue entry associated with the frame. Note that the frame which is deleted was previously put in the queue corresponding to the port of origination by virtue of the fbsy signal.

Significantly, the use of a link list in the present invention minimizes hardware by eliminating the need for a separate queue in hardware for each of the destination ports. Further, a double link list, which employs both a forward link and a backward link, is more preferred because it permits easier deletion and addition of queue entries within the list, as compared to a single link list. The double link list configuration utilized in the present invention is illustrated in FIGS. 5A and 5B.

As shown by arrows in FIG. 5A, a queue entry in a double link list 132 has a forward pointer 133*a* to the next queue entry in the list and a backward pointer 133*b* to the previous queue entry in the list. When queue entries are read from the queue, the scheduler 104 begins at the head and works toward the tail.

FIG. 5B illustrates the double link list of FIG. 5A with a queue entry in the middle of the list is deleted. In the double link list 134 of FIG. 5B, queue entry 2 is removed from the list. Note that this memory location contains the location of the links which must be changed, and hence, no search of the list is required to remove a queue entry.

It should be noted that link lists do not have a physical length. That is, link lists can all share the same physical memory space and grow as required. Each physical memory location then corresponds to a particular element in the list (i.e., each location corresponds to a specific buffer relative to a specific port).

In the preferred embodiment, the scheduler 104 is implemented with a commercially available digital signal processor (DSP) having an on-chip memory. Moreover, the destination queues 106 are situated within the on-chip memory of the DSP. The DSP advantageously permits pipelining of multiple instructions and very fast access to its on-chip memory. Hence, no external memory is required, as would be in the case of a RISC-based processor. Moreover, a DSP is much less expensive than other available full functionality processors with an on-chip memory.

Figure 6A:
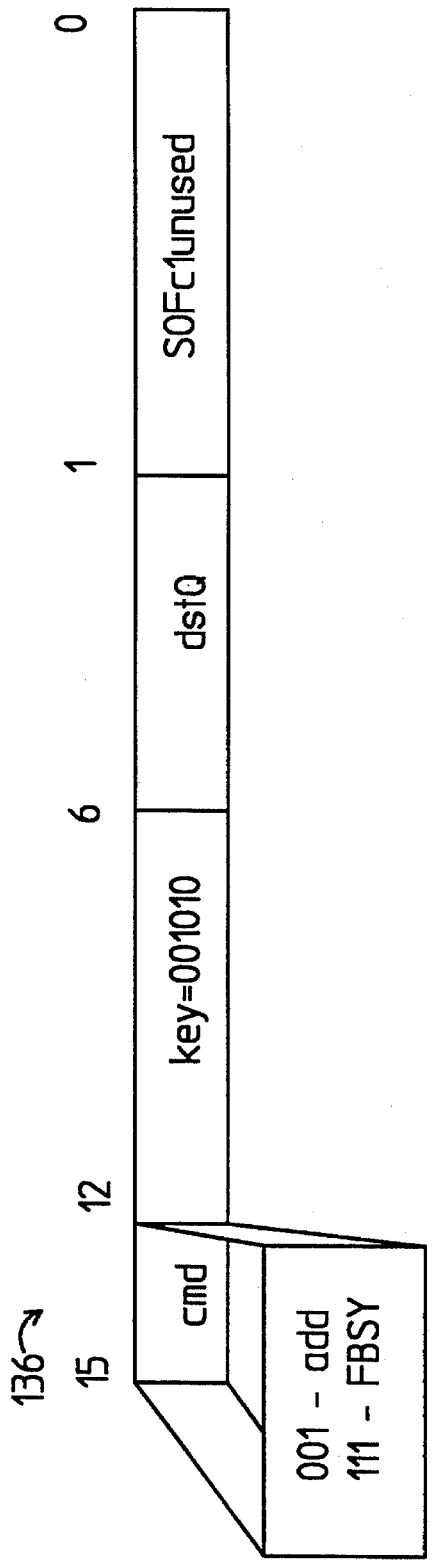
FIGS. 6A through 6D are schematic diagrams of queue management commands and data which is input to the scheduler of FIG. 4.
Figure 6B:
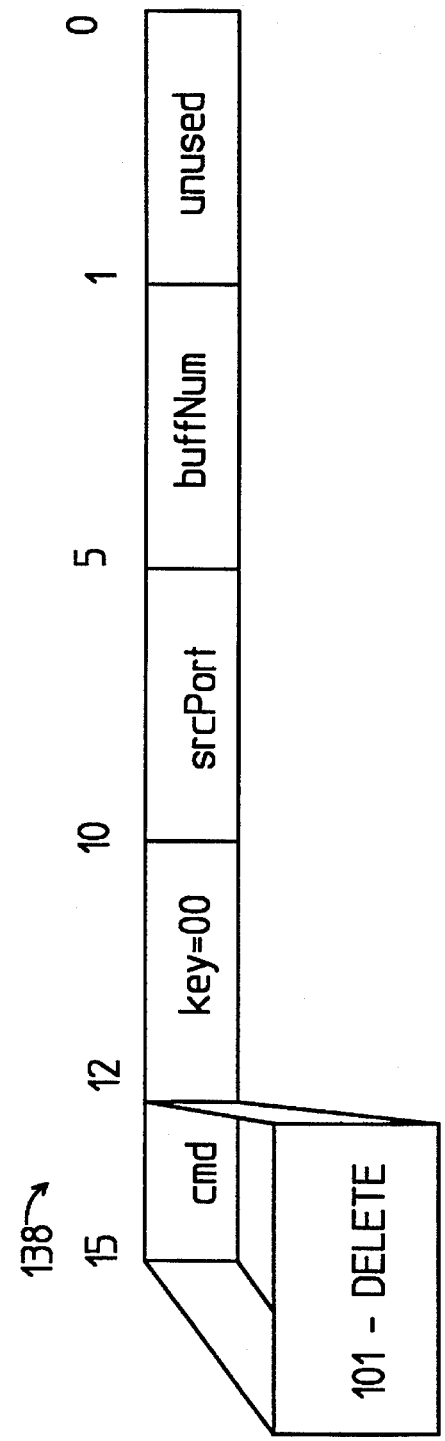
Figure 6C:
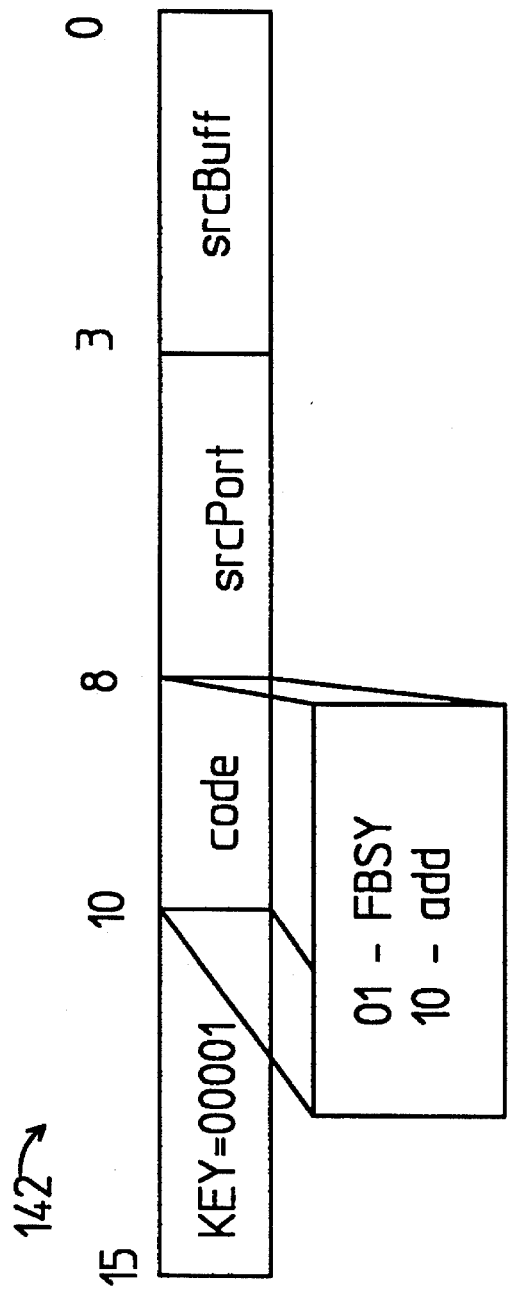

The specific data structures of the preferred embodiment of the scheduler 104 and its interaction with the new event generator 101 will now be described in detail for a better understanding of the present invention. The data structure of queue command signals received by the scheduler 104 from the new event generator 101 is illustrated in FIGS. 6A through 6C. If the scheduler 104 receives either an add or fbsy signal from the new event generator 101, then the new event generator 101 will send two successive words to the scheduler 104, i.e., the first word being that which is shown in FIG. 6A and the second word being that which is shown in FIG. 6C. However, if the scheduler 104 is to receive a delete signal from the new event generator 101, then the single word of FIG. 5B is forwarded to the scheduler 104 from the new event generator 101.

In the case of an add or a fbsy signal, the scheduler 104 receives, as indicated in FIG. 6A, the respective command, a base pointer address (e.g., key=001010; indicates tail for add signal and particular queue entry for fbsy signal), a destination queue indicator, and a class indicator (SOFc1) which indicates whether there will be either a class 1 transfer (SOFc1=1) or class 2 transfer (SOFc1=0). After the foregoing word, the scheduler 104 is forwarded a second word which indicates information where the new frame can be found. Particularly, the second word has the base pointer address (e.g., key=00001) which indicates the memory address location, a source port indicator to specifically identify the particular source port (and channel module 34) from which the data originated, and a source buffer indicator to specifically identify the particular buffer (buffers 154 of FIG. 8) within the corresponding receive memory 84.

In the case where the scheduler 104 receives a delete signal from the new event generator 101, the scheduler 104 receives the word as shown in FIG. 6B. The word has the delete command, a base pointer address, a source port indicator, and a buffer number.

Figure 8:
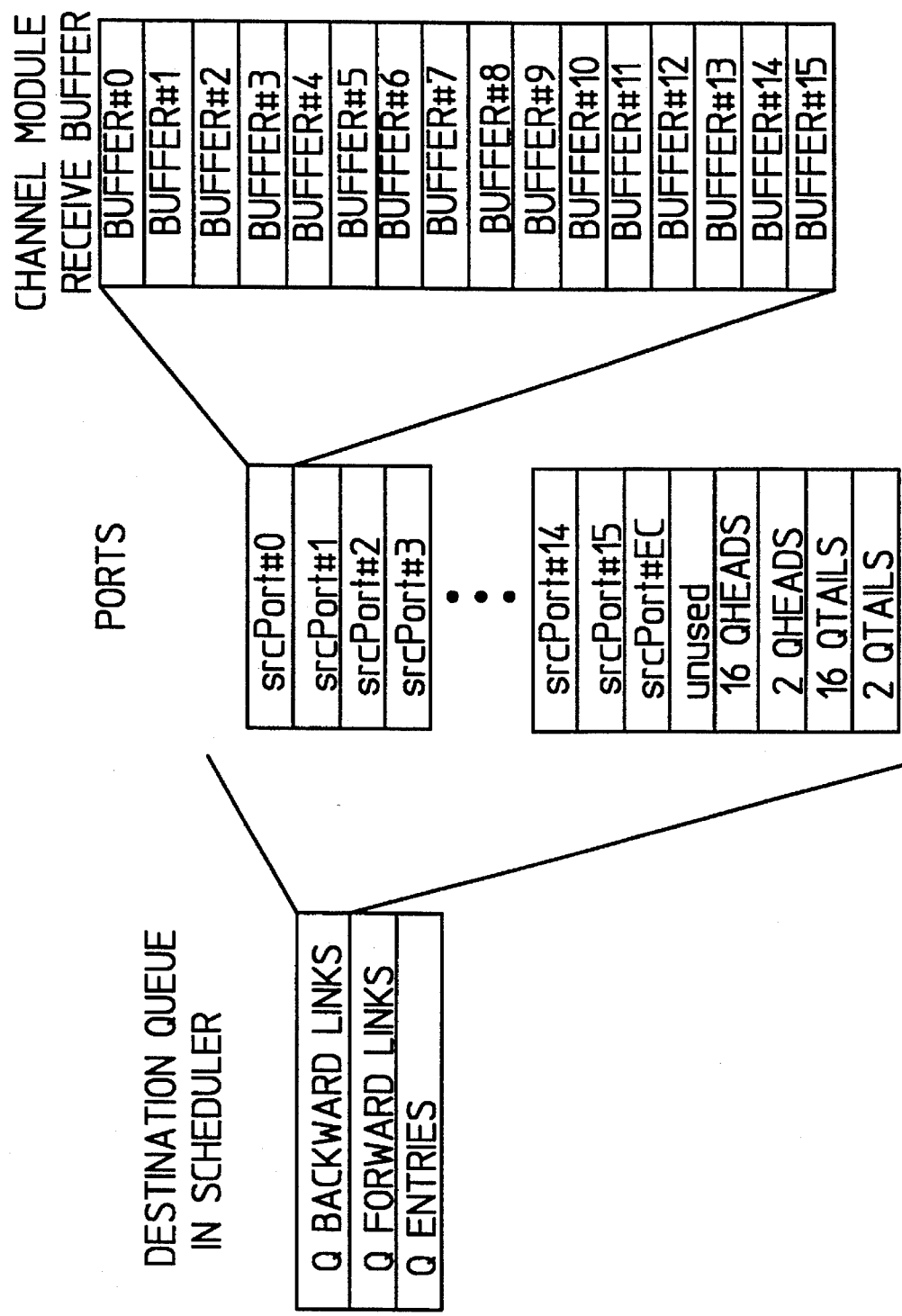
FIG. 8 is a schematic diagram illustrating the mapping of the queue entries and links of the scheduler into memory.

Each time a new frame is forwarded to the scheduler 104 to be added to a destination queue 106, the scheduler 104 adds the frame to the tail of a double link list for that particular destination port. In the preferred embodiment, the frame occupies three 16-bit locations in memory. The three locations contain a backward link 146 as shown in FIG. 7A, a forward link 148 as shown in FIG. 7B, and a queue entry 152 as shown in FIG. 7C. FIG. 8 illustrates the mapping of the backward and forward links 148, 152 and the queue entry 152 into internal memory.

The arbitrator 108 is implemented with any suitable logic, state machine, or processor, but is preferably implemented as group of state machines in an FPGA. The arbitrator 108 performs the following functions, among other things. It generally tracks the status of ports, as indicated by lines 124 in FIG. 4, determines when the ports are available for transmitting and receiving data, and arbitrates connections between the ports. Specifically, the arbitrator 108 monitors transmission ready (txready) and receive ready (rxready) signals generated by the status/control logic 85 (FIG. 3) of the channel modules 34. The arbitrator 108 can also be adapted to monitor intermix ready signals pertaining to the IDN 44 for the purpose of granting access to the IDN 44 for data transfers. Furthermore, when the arbitrator 108 receives a request signal 121 from the scheduler 104 to transfer data from a particular source port to a particular port, the arbitrator 108 determines whether the transfer is either class 1 (circuit switching) or class 2 (frame switching) via the flag as shown in FIG. 7C.

If class 1, then the arbitrator 108 determines if the particular destination port intelligence mechanism 73 is available for both transmitting and receiving data and determines if the particular source port intelligence mechanism 73 is ready to transfer data into the switch module 36. If class 2, then the arbitrator 108 determines whether the memory interface system 72 corresponding with the particular source port is ready to transfer data into the switch module 36 and whether the memory interface system 72 corresponding with the particular destination port is available for receiving data from the switch module 36.

When the foregoing devices are not ready to make the transfer (either class 1 or 2), then the arbitrator 108 refuses the scheduler's requests and the scheduler 104 revisits the request later, until the request is granted. Once a request has been granted by the arbitrator 108, the arbitrator 108 controls the MDN 42 or IDN 44 (FIG. 2) so that the MDN 42 or IDN 44 connects the appropriate source port to the appropriate destination port. Moreover, after the data transfer request has been granted, the arbitrator 108 forwards a scheduler clear signal 126 to the scheduler 104 so that the scheduler 104 eliminates the associated queue entry and links from the corresponding link list, and the arbitrator also forwards a timer clear signal 113 to the timer 103 to clear its internal fbsy/del clock for the transferred data frame.

Figure 6D:
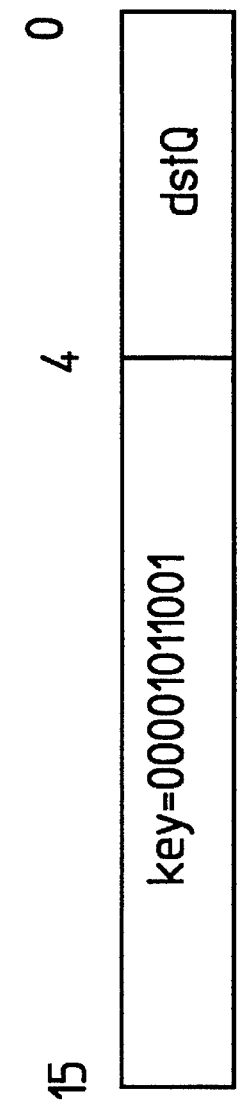

The service queue determination mechanism 109 is implemented via any suitable logic, but is preferably implemented as a state machine(s) via an FPGA or other suitable logic. The mechanism 109 monitors transmission ready (txready) signals pertaining to the ports 33, as indicated by status connection 128. The mechanism 109 can also be adapted to monitor intermix ready signals pertaining to the IDN 44, In the preferred embodiment, the service queue determination logic 108 performs a circular seek sequence wherein it searches in sequence through those port txready signals which are asserted, by masking out those which are deasserted, to determine the next destination port which is to be requested (as well as the next destination queue 106 to service). The service queue determination logic 109 forwards the identity of the next destination port to be serviced to the scheduler 104, as indicated by control connection 117. The format of the data sent to the scheduler 104 is shown at FIG. 6D. As shown in FIG. 6D, the word 144 comprises a base pointer address (e.g., key=00001011001) and a destination queue indicator. The scheduler 104 uses the base pointer address to access the heads of the double link list queues.

OPERATION

The overall operation of the path allocation system 50 as related to the fiber optic switch 30 will now be described relative to a class 2 data transfer where a new data frame is routed through the fiber optic switch 30 and to a class 1 data transfer where a bidirectional reserved data path is established between ports 33 through the switch 30.

Initially, a data frame is forwarded to the receive memory 84 of a memory interface system 72 within a channel module 34 from one of the source ports (p1–pi) 33. The status/control logic 85 of the port intelligence mechanism 73 associated with the source port 33 outputs an rxready signal onto the control bus 49, indicating that a new frame is available to be routed through the switch module 36. Based upon the rxready signal, the new event generator 101 recognizes that a new frame is available and requests path data from the status/control logic 85 associated with the source port 33 from which the new frame was received. The path data includes a source identification (SID), a buffer number indicating the location of the frame in receive memory 84, a destination port identification (DID), and a class indicator (class 1 or 2).

In this regard, the new event generator 101 communicates a sequence of control commands to the CDN 43 in order to set up the CDN for causing the status/control logic 85 associated with the source port 33 to forward the path data corresponding to the new frame. The CDN 43 then causes the path data for the new frame to be transferred from the status/control logic 85 to the new event generator 101. The new event generator 101 validates the SID and maps the DID to a specific destination port 33. If either the DID or SID is invalid, a reject frame signal is queued in the status/control logic 85 instead of the frame itself.

The new event generator 101 informs both the timer 108 and the scheduler 118 of the presence of the new frame. The timer 103 initiates an fbsy/del clock for the frame. The new event generator 101 concurrently sends an add signal 116 (word 136 in FIG. 6A) to the scheduler 104. The scheduler 104 determines which destination queue 106 to utilize based upon the destination queue (or port) indicator within the add signal 116 from the new event generator 101. Moreover, the base pointer address in the add signal 116 is utilized for accessing the tail of the desired destination queue.

The scheduler 104 then receives another word (word 142 of FIG. 6C) from the new event generator 101. The scheduler 104 uses the base pointer address, the source port, and the source buffer number to generate the queue entry. The queue entry is placed at the tail of the double link list for the particular destination queue 106.

In the event that the fbsy time period expires at the timer 103 before receiving the timer clear signal 113 from the arbitrator 108, the timer 103 will forward an fbsy signal 114 to the new event generator 101, which in turn will send an fbsy signal 116 (FIGS. 6A and 6B) to the scheduler 104. The scheduler 104 then deletes the queue entry associated with the fbsy signal 116 from its present queue and moves the queue entry to the queue corresponding with the source port 33 where the data originated, so that the data is eventually returned to the source port from which it originated.

If the predetermined delete time period expires at the timer 103 prior to receiving the timer clear signal 113, then the timer 103 will forward a delete signal 114 to the new event generator 101, which in turn will forward a delete signal 116 (word 138 of FIG. 6B) to the scheduler 104. At this point, the scheduler 104 will delete the queue entry associated with the expired delete time period (which was previously put in the queue 106 corresponding to the port of origination).

As queue entries are introduced into the queues 106 by the scheduler 104, the scheduler 104 is also concurrently routing requests 121 to the arbitrator 104 for particular data connections and destination ports. The scheduler 104 receives a next destination port signal 117 from the service queue determination mechanism 109. Accordingly, the scheduler 104 retrieves the queue entry at the head of the double link list corresponding to the next destination port. The scheduler 104 then sends a transfer request to the arbitrator 104 to access the foregoing destination port, as indicated by control connection 121.

The arbitrator 108 monitors the status (rxready and txready signals) of the source and destination ports and determines whether the particular source and destination ports are ready to exchange data. When the arbitrator 108 receives a request signal 121 from the scheduler 104 to transfer data from a particular source port to a particular destination port, the arbitrator 108 determines whether the transfer is either a class 1 (circuit switching) transfer or a class 2 (frame switching) transfer.

If class 1, then the arbitrator 108 determines if the particular destination port intelligence mechanism 73 is available for both transmitting and receiving data to and from the switch module 36 and if the source port intelligence mechanism 73 is ready to communicate data to the switch module 36. If class 2, then the arbitrator 108 determines whether the particular source memory interface system 72 is ready to transfer the data packet to the switch module 36 and whether the particular destination port intelligence mechanism 73 is available for receiving the data packet.

Once a class 1 transfer request has been granted by the arbitrator 123, the arbitrator 123 configures the MDN 42 (or the IDN 44) so that the NDN 42 (or the IDN 44) reserves a data path and connects the appropriate source port 33 to the appropriate destination port 33. Moreover, once a class 2 transfer request has been granted by the arbitrator 123, the arbitrator 123 configures the MDN 42 (or the IDN 44) so that the new data frame is channeled from the source memory interface system 72 associated with the source port 33 to the destination memory interface system 72, and ultimately to the appropriate destination port 33.

Upon the granting of either a class 1 or class 2 data transfer, the arbitrator 123 forwards a scheduler clear signal to the scheduler 118 so that the scheduler 118 eliminates the associated queue entry from the corresponding destination queue, and also forwards a timer clear signal to the timer 108 to clear the timer's internal fbsy/del clock corresponding to the frame. Moreover, after the timer 108 clears its clock, the timer 108 forwards a control signal to the status/control logic 85 associated with the source port 33 to ultimately cause the receive memory 84 to forward the new frame (or perhaps a frame rejection signal) to the switch module 36 and then the destination port 33.

It will be obvious to those skilled in the art that many variations and modifications may be made to the preferred embodiments without substantially departing from the principles of the present invention. All such variations and modifications are intended to be included herein within the scope of the present invention, as set forth in the following claims.

Wherefore, the following is claimed:

1. A path allocation system for allocating paths through a fiber optic switch for interconnecting fiber optic ports, comprising:

a queue corresponding to each of said ports, each said queue for storing addresses received from said ports and identifying data destined for a corresponding port, said addresses being arranged in an order by a link list wherein each of said addresses has an associated pointer indicating a successive address; and a processor for controlling said queues, said processor for storing said addresses received from said ports in said queues, said processor for generating and storing said pointers in said queues, said processor for retrieving addresses from said queues in said order defined by said link list, and said processor for causing transfer of data corresponding to said addresses to corresponding ports.

2. The system of claim 1, wherein said link list is a double link list, wherein said associated pointers are forward links of said double link list which identifies a subsequent entry in said order, and further comprising another pointer of said double link list which serves as a backward link to identify a previous queue entry in said order.

3. The system of claim 1, further comprising:

receive memory means for storing incoming data from said ports;

a switch means for communicating data from said memory means to said ports and between ports;

a new event generator connected to said receive memory means and configured to determine when data has been received from said ports, said new event generator for forwarding said addresses to said processor; and an arbitrator connected to said processor, said arbitrator for receiving transfer requests from said processor and for controlling said switch means pursuant to said transfer requests.

4. The system of claim 1, further comprising a receive buffer associated with each of said fiber optic ports directed to storing incoming data from each of said ports and wherein each of said addresses comprises a source port indicator which identifies a source port and a buffer indicator which identifies a particular receive buffer associated with said source port where data resides.

5. The system of claim 1, wherein said processor is a digital signal processor.

6. The system of claim 1, wherein said processor resides on a discrete integrated circuit component and wherein said queues reside in memory on said discrete integrated circuit component.

7. The system of claim 1, wherein each of said addresses includes a class indicator which identifies when data is to be transferred between ports via a frame transfer and via a reserved path transfer.

8. The system of claim 2, wherein said double link list implements a first-in-first-out procedure for said addresses stored in said destination queues.

9. The system of claim 2, further comprising a means associated with said processor for deleting an entry within said double link list of one of said queues by modifying said forward and said backward links associated with said entry.

10. A system for implementing a high performance fiber optic switch for a fiber optic network, comprising:

a plurality of fiber optic ports;

receive memory means for storing incoming data from said ports;

a switch means for communicating data from said memory means to said ports;

a queue corresponding to each of said ports, each said queue for storing addresses received from said ports and identifying data destined for a corresponding port, said addresses being arranged in an order by a link list wherein each of said addresses has an associated pointer indicating a successive address; and a scheduler configured to control said queues and said switch means, said scheduler configured to store said addresses received from said ports in said queues, said scheduler configured to generate and store said link list, said scheduler configured to retrieve said addresses from said queues in said order defined by said link list, and said scheduler configured to initiate transfer of data corresponding to said addresses to corresponding ports via said switch means.

11. The system of claim 10, wherein said link list is a double link list, wherein said associated pointer is a forward link of said double link list which identifies a subsequent entry in said order, and further comprising another pointer of said double link list which serves as a backward link to identify a previous queue entry in said order.

12. The system of claim 10, wherein said receive memory means comprises a plurality of receive memories, each of said receive memories comprising a plurality of buffers, and wherein each of said addresses comprises a source port indicator which identifies said receive memory and a buffer indicator which identifies a particular buffer within said receive memory where data resides.

13. The system of claim 10, wherein said scheduler is a digital signal scheduler.

14. The system of claim 10, wherein said scheduler comprises a processor situated on a discrete integrated circuit component and wherein said plurality of destination queues resides in a memory situated on said discrete integrated circuit component.

15. The system of claim 10, wherein each of said addresses includes a class indicator which identifies when data is to be transferred between ports via a frame transfer and via a reserved path transfer.

16. The system of claim 11, wherein said double link list implements a first-in-first-out buffer for said addresses stored in said destination queues.

17. The system of claim 11, further comprising a means associated with said scheduler for deleting a queue entry within said queues by modifying said forward and said backward links.

18. A method for implementing a high performance fiber optic switch for interconnecting fiber optic channels in a fiber optic network, comprising the steps of:

receiving data and a destination indicator from a source port, said destination indicator identifying a destination port;

storing said data at a location;

storing a queue entry in a queue corresponding to said destination port, said queue entry identifying said location;

defining said queue with a link list;

retrieving said entry from said queue based upon an order defined by said link list; and communicating data corresponding to said entry from said source port to said destination port.

19. The method of claim 18, wherein said link list is a double link list.

20. The method of claim 19, wherein said order is a first-in-first-out procedure.

* * * * *